United States Patent [19]

Boos et al.

[11] Patent Number: 4,505,692
[45] Date of Patent: Mar. 19, 1985

[54] TRACTION DEVICE FOR BUFFERING TUBES

[75] Inventors: Jürgen Boos; Achim Homersen, both of Düsseldorf; Klaus-Peter Schirmag, Ratingen, all of Fed. Rep. of Germany

[73] Assignee: Mannesmann Aktiengesellschaft, Düesseldorf, Fed. Rep. of Germany

[21] Appl. No.: 468,500

[22] Filed: Feb. 22, 1983

[30] Foreign Application Priority Data

Feb. 19, 1982 [DE] Fed. Rep. of Germany ....... 3206576

[51] Int. Cl.³ .............................................. F16H 7/08
[52] U.S. Cl. .................................... 474/111; 198/817
[58] Field of Search ............... 474/111, 109, 119, 122, 474/123, 128, 140, 231, 901, 134, 137; 305/24, 25; 198/817, 834, 841

[56] References Cited

U.S. PATENT DOCUMENTS

| 2,950,815 | 8/1960 | Oberg | 198/817 X |
| 3,638,781 | 2/1972 | Comley | 474/109 X |
| 4,142,625 | 3/1979 | Bourgeois | 198/834 X |

FOREIGN PATENT DOCUMENTS 657506  4/1965  Belgium ............................. 198/817

*Primary Examiner*—Stephen J. Novosad
*Assistant Examiner*—Thuy M. Bui
*Attorney, Agent, or Firm*—Ralf H. Siegemund

[57] ABSTRACT

A traction device for buffering tubes including a reversibly driven sprocket and two guide members, each member being pivotably adjustable about a horizontal axis to change its orientation for orienting the chain in different directions vis-a-vis the sprocket wheel.

2 Claims, 5 Drawing Figures

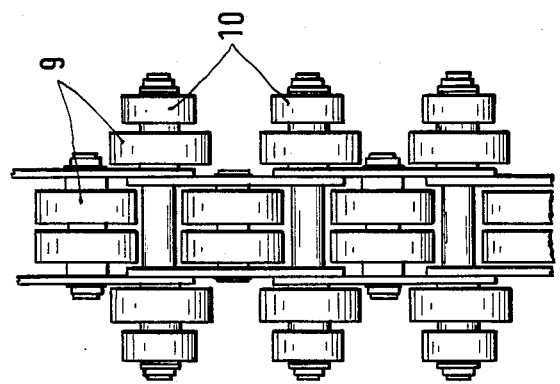
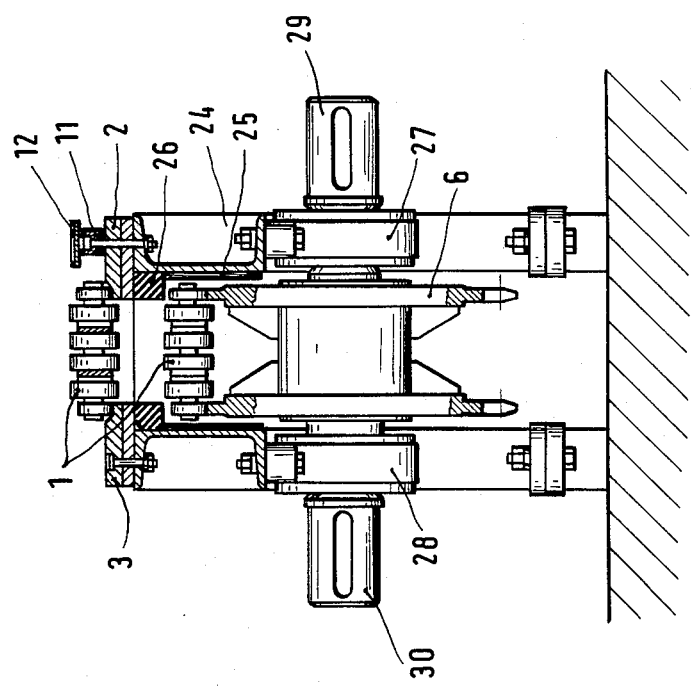

TRACTION DEVICE FOR BUFFERING TUBES

BACKGROUND OF THE INVENTION

The present invention relates to a reversible chain or caterpillar tractor for buffering elongated stock, such as tubes or pipes.

Caterpillar tractors or traction type conveyors are known having a sprocket type drive wheel for the traction chain and being arranged at one end, while a reversing wheel with tension equipment is provided on the opposite end. These known tractors are disadvanted by the fact that the chain traction force is increased by the tension device. This is a direct and inevitable consequence of the known arrangement. Moreover, an arrangement of the drive system in the range of the delivery facilities of the tractor impedes utilization of rotating delivery and transfer operations. A gapless transition between chainwheel and chain support is not possible for reducing the backing length for the stock to be buffered. Upon tensioning or retensioning the chain, the distance between the axles of the chainwheel is changed.

DESCRIPTION OF THE INVENTION

It is an object of the present invention to provide a new and improved reversible chain or caterpillar traction device for buffering elongated stock, such as tubes or pipes in which the need for a tensioning device has been obviated.

It is a particular object of the present invention to provide a traction device having one or more endless chains running along stationery deflection paths and including rolls along the upper stringer, the latter running on support surfaces, and having furthermore a reversible drive wheel of the sprocket engaging the chain.

In accordance with the preferred embodiment of the present invention, the device as per the specific object is improved by providing guide structures behind and in front of the sprocket drive wheel which guides establish variable and adjustable oblique surfaces for the chain controlling the guidance of the chain in relation to the sprocket reel. This permits feeding and discharge of stock at both ends, without change in distance between feed and oppositely located delivery points. Generally speaking, one of the guide members runs the chain in an upward direction towards the apex of the sprocket wheel, which the other member has a downward slope for catching the chain as it runs off the sprocket wheel. Upon reversing the wheel, the orientations of the guide members are exchanged accordingly.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 4 is a cross section through a single chain unit illustrated on an enlarged scale; and FIG. 5 illustrates a portion of a traction chain used in the system shown in FIGS. 1 through 4.

Proceeding now to the detailed description of the drawings, FIG. 1 illustrates four chain traction units for buffering in the transport of tubing. The tubes will extend parallel to the plane of the drawings and their arrangement as a group occcurs perpendicular to the plane of the drawing. The four chain units are denoted by reference Nos. 15, 16, 17 and 18 and they are provided with a central drive unit 19. Several sprocket wheels engaging the chains in the several units are interconnected by means of shafts 20 through 23, and together they are connected to the single drive 19.

FIGS. 2 and 3 illustrate one of the chain units being mounted in a frame 24 and having at opposite ends reversing and/or deflection sheets 4 and 5 enabling the chain 1 to function as an endless chain. Reference Nos. 13 and 14 denote stops, abuttments or rests against which tubes such as 31 and 32 are piled for temporary storage and buffering. These stops are provided at opposite ends of the upper transporting and operating surface of the chain. These stops are selectively controllable as to retraction and they are thus individually removable from the conveyance and buffer path for these tubes.

Figure 1:
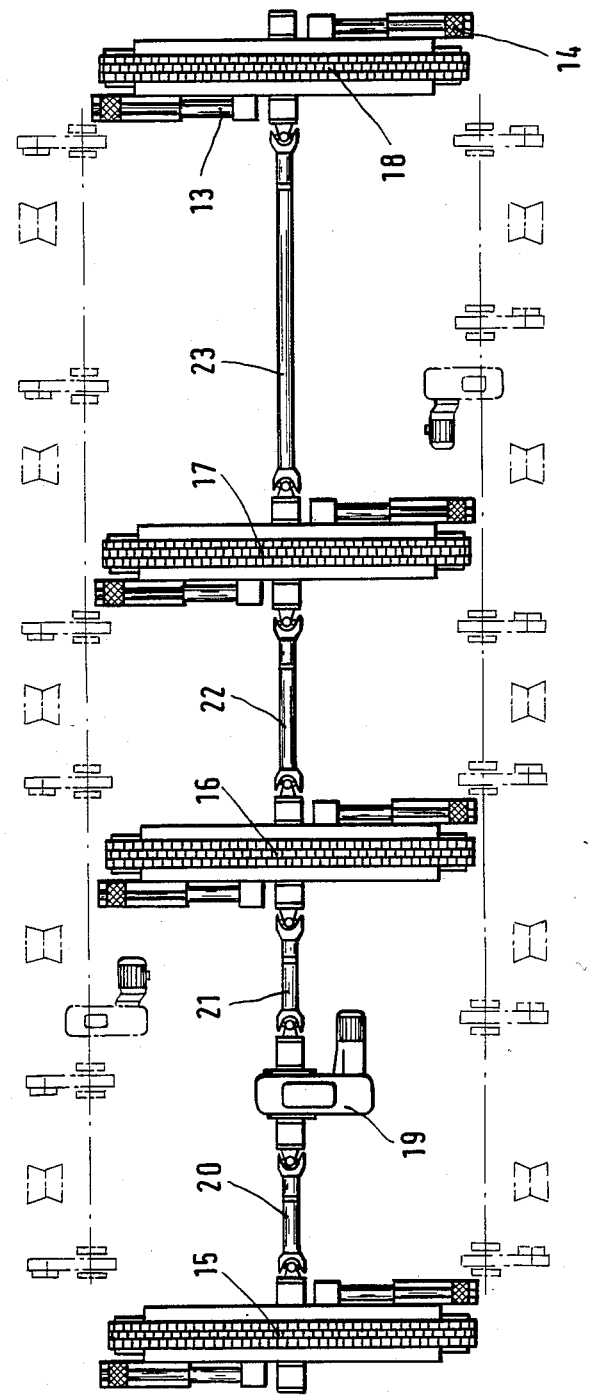
FIG. 1 is an overall and front view of a traction device in accordance with the preferred embodiment of the present invention for practicing the best mode thereof in conjunction with four, parallely operating chain systems.

In about the middle between the two deflection elements 4 and 5 is provided a sprocket wheel 6 which engages the chain 1 and advances the same in the selected direction. Accordingly, the wheel 6 is reversibly driven as can be seen by comparing the arrows in FIGS. 2 and 3. Chain guide members 25 and 26 insure that the chain is in proper engagement with the sprocket wheel 6, particularly along the upper half thereof as far as the orientation of that particular wheel within the drive system is concerned.

In accordance with the principal features of the present invention, guides 7 and 8 are provided to both sides of the sprocket wheel 6. These guides 7 and 8 are adjustable with regard to their angle in the vertical plane, their adjustment being carried out correspondingly about horizontal axes. By means of these guides 7 and 8, one adjusts the relationship of the chain, particularly of the lower stringer thereof with regard to the wheel 6. The general rule is that the particular guide on the side facing the wheel when the wheel is moving as to its upper portion away from the guide, that guide will be adjusted to direct the chain at an upwardly inclined angle to run the chain towards more or less the top position of the wheel while the respective other guide has an angle which is downwardly directed to, so to speak, catch the wheel as it drops off the wheel on the downward slant.

Figure 2:
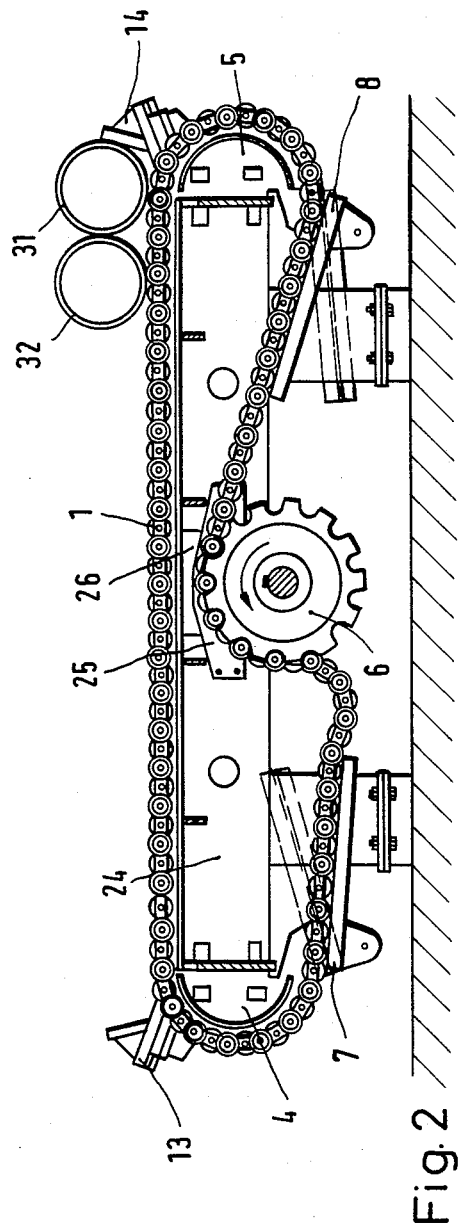
FIG. 2 is a cross section through one of the chain systems shown in FIG. 1.
Figure 3:
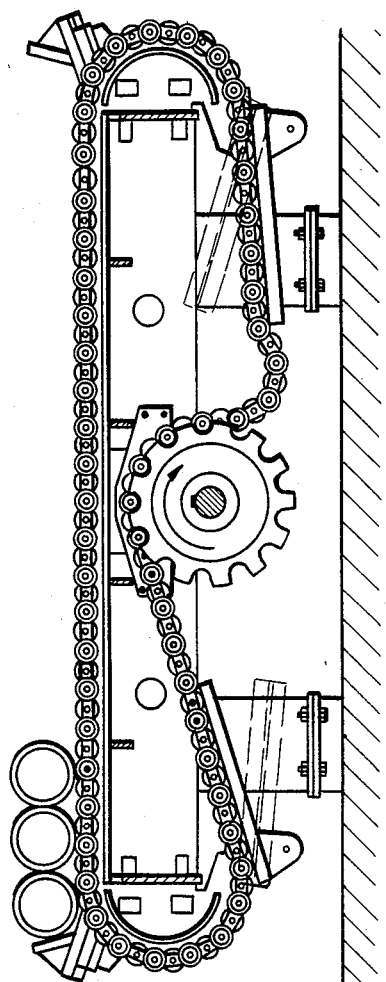
FIG. 3 illustrates the same section as shown in FIG. 2, but the mode of operation has been reversed.

The principles outlined above are realized in the two FIGS. 2 and 3. One can see in particular that in the case of a sprocket wheel drive motion tending to move the upper stringer of the chain from left to right the movement in the lower stringer is from right to left, and the chain as it comes back from the upper stringer is moved at a slightly upwardly inclined slant towards the top of the sprocket wheel 6 which moves it down, and the guide 7 is oriented at a slightly downwardly inclined angle and catches the wheel before moving it towards the reversing member 4.

In FIG. 3 the situation is in the reverse, the chain moves in its upward stringer from right to left, and deflection member 4 returns the chain to member 7 which has a slightly upwardly inclined angle and runs the chain towards the top part of the wheel 6, turning in the drawing in clockwise direction. The member and guide 8 is oriented at a slight downward inclination and catches the chain as it drops off the wheel 6 and runs it towards the reversing member 5.

Invariable, that is, independent from the direction of the motion of the chain and from the relative inclination and orientation of the guide members 7 and 8 are provided chain guides 25 and 26. These guides are horizontally oriented and insure that the upper portion of the wheel 6 remains in positive engagement with the chain on its lower stringer path and independently from the direction of movement.

Turning now to FIG. 4, the particular chain and its guide and arrangement is depicted in greater detail in this figure and in a cross sectional view. The main stand or frame of the system 24 includes and supports track rails 2 and 3 for the chain, particularly the upper stringer thereof in each instance. Moreover, one of these tracks, namely track 2 is provided with a guide bar 11 which in turn is provided with a synthetic layer 12 for lowering friction. This way tubes to be supported by the chain are guided to maintain a horizontal disposition and orientation.

FIG. 4 moreover illustrates the sprocket wheel 6 which is constructed as a double wheel and supports and engages the lower stringer of the chain 1. The pair of wheels 6 is journaled in bearings 27 and 28, and the shaft ends are designated by reference Nos. 29 and 30. Returning briefly to FIG. 1 it can be seen that these shaft ends are provided to receive couplings by means of which either two chain systems are interconnected or a chain system is connected to the drive (19) to provide a common drive train for all of the chains.

FIG. 5 illustrates in greater detail a particular configuration for a chain to be used in conjunction with the system of the invention. The illustrated chain consists of staggered pairs of support load rolls 9 and general support rolls 10. The support rolls 10 are arranged only for every other pair of load carrying rolls and they are situated outside of the chain proper. This arrangement permits ready exchange of rollers, particularly of the support rollers 10, without dismanteling the chain 1 as a whole. Some of the load bearing rolls 9 are likewise disposed outside of the chain configuration and these can indeed be replaced in the same manner. It can thus be seen, that exchanging and replacing these outside rolls permits maintaining the interconnection between the chain links and the bolts linking the chain members. Exchange is somewhat more difficult only for those load carrying rolls which are disposed inbetween the chain link members, and here the removal of interconnecting bolts is necessary.

The inventive traction device permits delivery of tubes at either end and by means of rotating delivery equipment at these ends. The tubes may be of different diameter and may differ in dimensions as is actually illustrated in FIGS. 2 and 3. Differences may also entail differences in weight. This in turn produces differences in penetration depth of the tracks from plane as theoretically defined by the uppermost portion of each of the transfer rolls, but the construction permits a limitation in this regard and, therefore, the useful life of the rolls is increased accordingly.

The various rolls can be exchanged with ease and the endless chains running on support sheets are deflected at the end of the buffer path without gaps. FIGS. 2 and 3 illustrate in particular that the stops 13 and 14 permit the buildup of a buffer supply of tubes on either end depending of course upon the direction of movement of the traction device which is controlled by the direction of rotation of the sprocket wheels 6 in cooperation with the orientation of the guide and deflection sheet 7 and 8.

It was also found that the tubes move in relation to each other very little in this particular kind of equipment which has a beneficial side effect; the noise of moving heavy tubing is considerably reduced. Another important aspect is the fact that the total length of the traction device remains constant, there is no length change involved due to any tensioning or the like. This means that the end to end spacing of the traction device is constant so that the relative disposition of equipment adjacent to either end of the traction device can remain constant. This, of course, is highly beneficial as far as general installation is concerned.

The invention is not limited to the embodiments described above, but all changes and modification thereof not constituting departures from the spirit and scope of the invention are intended to be included.

We claim:

1. A reversible traction device for transferring elongated stock and including one or more endless chains with transport and traction rollers and including further support means for the upper stringer of each of the endless chains, the improvement comprising:

a reversibly driven sprocket like drive wheel engaging the upper stringer of one of the chains; and two guide members respectively disposed to one side and the other of the sprocket wheel, each member being pivotably adjustable about a horizontal axis to change its orientation for orienting the chain in different directions vis-à-vis the sprocket wheel such that the particular guide member running the chain towards the sprocket wheel is oriented to direct the chain towards the apex of the sprocket wheel with an upward inclination accordingly, while the respective other one of the guide members is slightly downwardly oriented for catching the chain as it runs off said sprocket wheel, said guide members reversing orientations upon reversal of the sprocket wheel.

2. Chain and the device as per claim 1 being comprised of chain link members with rollers disposed in between chain link members and on the outside thereof for ease of exchanging the rollers upon wear.

* * * * *